United States Patent [19]

Knodel

[11] 3,865,806

[45] Feb. 11, 1975

[54] LOW VISCOSITY, LOW EQUIVALENT WEIGHT POLYETHER POLYOLS AND A METHOD FOR THEIR PREPARATION

[75] Inventor: Louis Robert Knodel, Lake Jackson, Tex.

[73] Assignee: The Dow Chemical Company, Midland, Mich.

[22] Filed: Jan. 28, 1972

[21] Appl. No.: 221,783

Related U.S. Application Data

[62] Division of Ser. No. 102,234, Dec. 28, 1970, abandoned.

[52] U.S. Cl.... 260/209 R, 260/2.5 AP, 260/2.5 AS, 260/210 R, 260/611 B, 260/615 B
[51] Int. Cl............................................ C07c 47/18
[58] Field of Search.......... 260/209 R, 615 B, 611 B

[56] References Cited
UNITED STATES PATENTS

| | | | |
|---|---|---|---|
| 2,902,478 | 9/1959 | Anderson........................ | 260/209 R |
| 3,190,927 | 6/1965 | Patton, Jr. et al. ............. | 260/209 R |
| 3,277,076 | 10/1966 | Yotsuzuka ...................... | 260/209 R |
| 3,346,557 | 10/1967 | Patton, Jr. et al. ............. | 260/209 R |
| 3,391,196 | 7/1968 | Earing et al..................... | 260/209 R |
| 3,441,616 | 4/1969 | Pizzini et al..................... | 260/209 R |
| 3,510,471 | 5/1970 | Case............................... | 260/209 R |

*Primary Examiner*—Johnnie R. Brown
*Attorney, Agent, or Firm*—James G. Carter

[57] ABSTRACT

Low equivalent weight polyether polyols are prepared from initiator compounds having from about 4 to about 8 active hydrogen atoms such as sucrose and a mixture of ethylene oxide and an alkylene oxide containing 3 to 4 carbon atoms such as propylene oxide. The process reduces the preparation time for the polyether polyols by as much as 67 percent and the viscosity of the polyether polyol is lower. The polyether polyols may be employed in the production of rigid polyurethane foams.

13 Claims, No Drawings

LOW VISCOSITY, LOW EQUIVALENT WEIGHT POLYETHER POLYOLS AND A METHOD FOR THEIR PREPARATION

This application is a division of application Ser. No. 102,234, filed Dec. 28, 1970 and now abandoned.

This invention relates to low viscosity, low equivalent weight polyether polyols, a method for preparing said polyether polyols and rigid polyurethane foams prepared therefrom. This invention more particularly relates to polyether polyols prepared by reacting a mixture of ethylene oxide and an alkylene oxide having from 3 to 4 carbon atoms with an initiator compound having an active hydrogen functionality of from about 4 to about 8 or with a mixture of initiator compounds having an average active hydrogen functionality of from about 4 to about 8.

Various methods have previously been employed to prepare polyether polyols having from 4 to 8 hydroxy groups. Among these are included methods whereby solid initiator compounds are slurried with an inert solvent such as xylene and the like, and then adding an alkylene oxide either as a single charge or in incremental amounts, the reaction being conducted in the presence of suitable catalysts. These methods have the disadvantage in that the product contains foreign material, i.e., the inert solvent, which must be removed from the product. Other methods include slurrying the solid initiator compound with water and then adding the alkylene oxide either as a single charge or incrementally. This is disadvantageous in that the product then contains products having a low functionality of 2 resulting from reaction of the water with the alkylene oxide. All of the above processes have the disadvantage in that the reaction times are relatively long and the reaction products possess relatively high viscosities or the viscosity is reduced by means of low functionality material.

It is an object of the present invention to provide low viscosity polyether polyols having a functionality of from about 4 to about 8 and an equivalent weight of from about 80 to 220.

It is also an object of the present invention to prepare polyether polyols from solid hydroxyl-containing compounds in relatively short reaction times.

Another object of the present invention is to prepare polyether polyols having relatively low viscosities from solid hydroxyl-containing compounds, wherein the preparation is conducted in the absence of water.

These and other objects will become apparent from the following detailed description of the present invention.

The low viscosity polyether polyols of the present invention are the adducts of an initiator compound having from about 4 to about 8 active hydrogen atoms per molecule or a mixture of said initiator compounds and a compound having 3 active hydrogen atoms wherein said mixture contains an average of 4 to 8 active hydrogen atoms per average molecule with a mixture comprising from about 1 to about 50 percent and preferably from about 2 to about 10 percent by weight of ethylene oxide and from about 50 to about 99 percent and preferably from about 90 to about 98 percent by weight based on total oxide of a vicinal alkylene oxide having from 3 to 4 carbon atoms or mixtures thereof and wherein the resultant polyether polyol has an active hydrogen equivalent weight from about 80 to about 220 and preferably from about 100 to about 190.

The above novel compositions have lower viscosities than do those polyether polyols prepared from the alkylene oxides having 3–4 carbon atoms. The low viscosity is valuable in that in the preparation of rigid polyurethane foams, mixing of the components is more readily achieved, particularly in the preparation of high density rigid polyurethane foams, i.e., above about 5 lbs per cubic foot wherein lesser quantities of blowing agent are employed. A further advantage is that the resultant foamable mixture, i.e., polyol, polyisocyanate, catalyst, blowing agent and surfactant mixture is significantly lower in viscosity so as to provide better flow-out of the foamable mixture into the mold.

It has been surprisingly discovered that rigid polyurethane foams prepared from the polyether polyols of the present invention were not adversely affected by the presence of the ethylene oxide groups in the normal density range of about 2.0 lbs. per cubic foot wherein the alkylene oxide mixture contains 1 to 10 percent by weight ethylene oxide and in high density foams, i.e., about 5 to 25 pounds per cubic foot and above wherein the ethylene oxide content of the alkylene oxide mixture is up to 25 percent and above to about 50 percent by weight.

The improved process of the present invention comprises reacting an initiator compound having an active hydrogen functionality of from about 4 to about 8 or a mixture of initiator compounds having a functionality of from 3 to 8 wherein the average active hydrogen functionality is at least 4 with a mixture of alkylene oxides comprising from about 1 to about 50, preferably from about 2 to about 10 percent, by weight of ethylene oxide and from about 50 to about 99 and preferably from about 90 to about 98 percent by weight of a vicinal alkylene oxide having from 3 to 4 carbon atoms per molecule wherein the quantity of the mixture of alkylene oxides is sufficient to produce a polyether polyol having an active hydrogen equivalent weight of from about 80 to about 220 and preferably from about 100 to about 190.

The process of the present invention is conducted in the absence of added quantities of water. However, this does not preclude the use of commercial grades of reactant materials that inherently contain small quantities of water due to absorption of moisture from the air or the incomplete removal of moisture during manufacture and the like from being employed in the process of the present invention. Said small quantities of water may be defined as being less than about 0.5 percent and preferably less than about 0.2 percent by weight based upon the total quantity of reactant materials, i.e., the initiator or polyhydroxyl-containing compound and the vicinal alkylene oxide and ethylene oxide.

The improved process of the present invention is particularly advantageous in the preparation of polyhydroxyl-containing compounds by the so-called bulk polymerization technique wherein all of the reactants and catalyst are added to the reaction vessel at essentially the same time. However, improvements in the form of reduced reaction time and lower viscosities are also obtained when the incremental addition technique is employed, i.e., the mixture of alkylene oxides is incrementally added to a mixture of the initiator compound and catalyst.

Although the process of the present invention does not require a slurrying compound such as xylene and the like, the advantage of reduced reaction times are also achieved when such slurrying compounds are employed.

A particular advantage of the present invention is that such slurrying agents are not required when the bulk polymerization technique is employed.

The process of the present invention may be carried out under the reaction conditions usually employed in the preparation of polyether polyols, however, for a given set of reaction conditions and catalyst concentration, the improved process of the present invention provides for greatly reduced reaction times.

Suitable polyhydroxyl-containing initiator compounds containing 4 to 8 hydroxyl groups which are employed in the present invention include, for example, aliphatic hydroxyl-containing compounds and cycloaliphatic hydroxyl-containing compounds, such as sucrose, α-methyl glucoside, mono, di and poly pentacrithritols, sorbitol, di and polyglycerols, glycolised starch, inositol, mixtures thereof and the like. Also, mixtures of trihydroxyl compounds such as glycerine, trimethylol propane and the like with compounds containing 4 to 8 hydroxyl groups can be employed provided the average hydroxyl functionality is at least about 4.

Suitable vicinal alkylene oxides which are employed in the process of the present invention include, for example, 1,2-propylene oxide, 1,2-butylene oxide and 2,3-butylene oxide.

Catalysts which are usually employed in reactions involving a polyhydroxyl-containing compound having from about 4 to about 8 hydroxyl groups and a vicinal alkylene oxide may also be employed as catalysts in the process of the present invention and include, for example, tertiary amines such as trimethylamine, triethylamine and the like, alkali metal hydroxides such as, for example, sodium hydroxide, potassium hydroxide and the like. When alkali metal hydroxides are used, their removal from the final product can be effected through conventional techniques such as ion exchange or neutralization with acids and subsequent filtration.

When the bulk polymerization method is employed, it is preferable that a tertiary amine catalyst be employed when the polyhydroxyl-containing initiator contains 4–8 hydroxyl groups. However, when blends of the solid initiators containing 4–8 hydroxyl groups such as sucrose with an initiator compound having 3 hydroxyl groups, such as glycerine, are employed, the alkali metal hydroxides such as sodium hydroxide may be employed as the catalyst. This is because the alkali metal hydroxides are not usually readily soluble in the solid initiators having from about 4 to about 8 hydroxyl groups; however, molten sorbitol is an exception, whereas the alkali metal hydroxides are usually readily soluble in the liquid initiators containing 3 hydroxyl groups such as glycerine and the like. Therefore, it is preferred that the catalyst employed be soluble in the reaction mixture, the reaction mixture being defined as the initiator alkylene oxide mixture slurries wherein the bulk polymerization method is employed and the initiator wherein the incremental addition method is employed.

The quantity of ethylene oxide which is employed in the process of the present invention to decrease the time required for reacting a vicinal alkylene oxide with the polyhydroxyl-containing compound is in the range of from about 1 percent to about 50 percent by weight based upon the total amount of alkylene oxide used and preferably from about 2 percent to about 10 percent. When less than about 1 percent ethylene oxide is employed, no significant improvement in reaction time is observed and when above about 10 percent ethylene oxide is employed, the hydrophyllic nature of the ethylene oxide portion of the polyol may become noticable in certain applications. However, when the polyols are used to make high density, rigid, polyurethane foams, larger amounts of ethylene oxide, up to 50 percent, can be used.

The conditions of reaction which are employed in the process of the present invention are typical of those usually employed in reacting a vicinal alkylene oxide with a polyhydroxyl-containing compound, i.e., temperatures in the range of from about 70° to about 160°C and preferably from about 80° and 120°C and pressures of from about 15 psig to about 200 psig and preferably from about 25 psig to about 140 psig are generally employed.

In the process of the present invention the ethylene oxide is blended with the vicinal alkylene oxide having 3 to 4 carbon atoms and this mixture then mixed with the polyhydroxyl-containing compound and a suitable catalyst in a suitable reaction vessel. An amount of alkylene oxide sufficient to form a polyol having about 80 to about 220 hydroxyl equivalent weight is used. Since the ethylene oxide acts to shorten the initial stage of the reaction the advantage of its use is most significant in this low equivalent weight range.

The polyether polyols of the present invention may be used alone or mixed with other polyols and foams prepared therefrom. The polyols with which the polyether polyols of the present invention may be mixed can have a hydroxyl or active hydrogen functionality of from about 2 to about 8 and an equivalent weight within the range of from about 80 to about 220.

EXAMPLES 1–9

In the following examples, all of the reaction components including catalyst were charged to a reaction vessel having a temperature recording and control means, a means for stirring, a pressure recording and control means and a means for purging with an inert gas. After charging all the reactants and catalyst to the reaction vessel, the vessel was purged with inert gas and the reaction started. In each of the examples, the reaction was continued until a constant pressure in the reaction vessel was obtained. The reactants, reaction conditions and product analysis are indicated in Table I.

TABLE I

| | CONTROL 1 | EXAMPLE 1 | CONTROL 2 | EXAMPLE 2 | CONTROL 3 | EXAMPLE 3 | CONTROL 4 | EXAMPLE 4 | CONTROL 5 | EXAMPLE 5 |
|---|---|---|---|---|---|---|---|---|---|---|
| CHARGE TO REACTION VESSEL: | | | | | | | | | | |
| Glycerine, gms. | | | | | | | | | | |
| Sucrose, gms. | 2052 | 2052 | 27.25¹ | 27.25¹ | 888 | 888 | | | 652 | 682 |
| Pentaerythritol, gms. | | | | | | | | | 867 | 867 |
| Butylene Oxide, gms. | | | | | | | 1360 | 1360 | | |
| Ethylene Oxide, gms. | 0 | 58 | 0 | 2.35¹ | 0 | 363 | 3040 | 2857 | | 821 |
| | | | | | | | 0 | 220 | | |

TABLE I—Continued

| | CONTROL 1 | EXAMPLE 1 | CONTROL 2 | EXAMPLE 2 | CONTROL 3 | EXAMPLE 3 | CONTROL 4 | EXAMPLE 4 | CONTROL 5 | EXAMPLE 5 |
|---|---|---|---|---|---|---|---|---|---|---|
| Propylene Oxide, gms. | 2892 | 2834 | 47.2[1] | 44.85[1] | 8[1] | 7.25[1] | | | 7.25[1] | 5.44[1] |
| Triethyl amine, gms. | 16 | 16 | 132[2] | 132[2] | | | | | | |
| Trimethyl amine, gms. | | | | | 6.4 | 6.6 | 8.8 | 8.8 | 2.9 | 2.9 |
| % Ethylene Oxide based on total oxide by wt. | 0 | 2 | 0 | 5 | 0 | 10 | 0 | 6 | 0 | 25 |
| REACTION CONDITIONS: | | | | | | | | | | |
| Temperature °C (avg.) | 105 | 105 | 112 | 112 | 88 | 88 | 100 | 100 | 86 | 87 |
| Reaction Time, hrs.[3] | 30 | 10.5 | 15.5 | 3.25 | 19 | 15 | 7.5 | 3.5 | 22 | 17 |
| % Reduction in Reaction Time | — | 65 | — | 79 | — | 21 | — | 53.3 | — | 22.7 |
| PRODUCT ANALYSIS: | | | | | | | | | | |
| OH Equiv. Weight | 104 | 106 | 104 | 103 | 182 | 186 | 107 | 111 | 115 | 115 |
| Viscosity, Centistokes at 210°F | 740 | 622 | 788 | 553 | 72 | 62 | 4642[6] | 3427[6] | 1650[7] | 1048[7] |
| % Reduction in Viscosity | — | 16 | — | 29.6 | — | 13.9 | — | 26.1 | — | 36.5 |

| | CONTROL 6 | EXAMPLE 6 | EXAMPLE 7 | EXAMPLE 8 | EXAMPLE 9 |
|---|---|---|---|---|---|
| CHARGE TO REACTION VESSEL: | | | | | |
| Glycerine, gms. | | | | | |
| Sucrose, gms. | 1208 | 19[1] | 19[1] | | 1208 |
| Pentaerythritol, gms. | | | | | |
| Butylene Oxide, gms. | | | | | |
| Ethylene Oxide, gms. | | 5[1] | 2.625[1] | | 3.75[1] |
| Propylene Oxide, gms. | 3400[1] | 48[1] | 50.25[1] | | 3.75[1] |
| Triethyl amine, gms. | 5.5 | | | | |
| Trimethyl amine, gms. | | 40 | 60 | | 2.4 |
| % Ethylene Oxide based on total oxide by wt. | 0 | 10 | 5 | 25 | 50 |
| REACTION CONDITIONS: | | | | | |
| Temperature °C (avg.) | 85 | 92.5 | 94.5 | 95 | 85.5 |
| Reaction Time, hrs.[3] | 12.75 | 10 | 5.5 | | 14 |
| % Reduction in Reaction Time | | | NDC[5] | | |
| PRODUCT ANALYSIS: | | | | | |
| OH Equiv. Weight | 155 | 159 | 160 | 160 | 163 |
| Viscosity, Centistokes at 210°F | 122 | 105 | 101 | 84 | 75 |
| % Reduction in Viscosity | | | NDC[5] | | |

FOOTNOTES FOR TABLE I:
[1] pounds
[2] milliliters
[3] Reaction time is measured from the time reaction temperature is reached to the time the pressure (due to the vapor pressure of unreacted alkylene grade) decreases to a low, constant value.
[4] In this example, the reactor was initially charged with 56 lbs. sucrose, 75 lbs. propylene oxide, 25 lbs. ethylene oxide and 90 grams trimethyl amine. The contents were reacted at 95°C for 13 hours. Then 26 lbs. of the product was removed from the reactor and then 33.75 lbs. of propylene oxide and 11.25 lbs. ethylene oxide were added to the contents of the kettle and digested at 95°C for an additional 9.75 hours.
[5] Not directly comparable (NDC) because of different quantities of initiator employed and different catalyst concentrations. These polyols were employed in foam comparison tests. See Table II.
[6] measured at 77°F instead of 210°F.
[7] measured at 100°F instead of 210°F.

EXAMPLES 10–15

The polyether polyols labeled Control 6 and Examples 6 through 9 were employed as the polyol in the preparation of high density polyurethane foams for purposes of comparing the effect of ethylene oxide concentration on the foam properties. A typical formulation for preparing high density rigid polyurethane foams was employed. In the preparation of these foams, all the ingredients were blended together except for the polyisocyanate, after which the polyisocyanate was added and the contents blended for 15 seconds and subsequently poured into a mold having a cavity of the dimensions, 1½ × 9 × 15 inch. The panels were demolded in 10 minutes and after curing overnight at room temperature, the physical properties were obtained. The compositions of each foam and their attendant properties are given in the following Table II.

TABLE II

| FOAM FORMULATION: | CONTROL 7 | EXAMPLE 10 | EXAMPLE 11 | EXAMPLE 12 | EXAMPLE 13 | CONTROL 8 | EXAMPLE 14 | EXAMPLE 15 |
|---|---|---|---|---|---|---|---|---|
| Polyol from Ex. No. | Control 6 | Ex. 7 | Ex. 6 | Ex. 8 | Ex. 9 | VORANOL RS 350[3] | Ex. 8 | Ex. 9 |
| Grams | 436 | 443 | 442 | 443 | 446 | 498 | 500 | 505 |
| % EO in Polyol | 0 | 5 | 10 | 25 | 50 | 0 | 25 | 50 |
| P-400[1], grams | 59.4 | 60.5 | 60 | 60.4 | 60.8 | 0 | 0 | 0 |

TABLE II – Continued

| FOAM FORMULATION: | CONTROL 7 | EXAMPLE 10 | EXAMPLE 11 | EXAMPLE 12 | EXAMPLE 13 | CONTROL 8 | EXAMPLE 14 | EXAMPLE 15 |
|---|---|---|---|---|---|---|---|---|
| PAPI[2], grams (105 NCO Index) | 504 | 495 | 498 | 495 | 496 | 504 | 503 | 500 |
| DC 193 silicone oil, grams | 10 | 10 | 10 | 10 | 10 | 10 | 10 | 10 |
| Water, grams | 4.1 | 4.0 | 5 | 5 | 5 | 5 | 5 | 5 |
| Triethylenediamine, grams | 5 | 5 | 3.9 | 4.1 | 3.8 | 4.2 | 4.1 | 3.8 |
| PHYSICAL PROPERTIES: | | | | | | | | |
| Core density, No./ft$^3$ | 14.7 | 14.6 | 14.6 | 14.0 | 14.5 | 12.80 | 12.31 | 12.58 |
| Flexural modulus of rupture, psi | 686 | 675 | 773 | 668 | 656 | 604 | 562 | 525 |
| Flexural modulus of elasticity, psi | 20800 | 20600 | 21500 | 19400 | 18530 | 18800 | 15800 | 13000 |
| Compressive modulus of elasticity, psi | 10600 | 9950 | 10400 | 10125 | 10340 | 8125 | 8300 | 7700 |
| Compressive yield strength, psi | 566 | 487 | 545 | 427 | 489 | 500 | 450 | 398 |
| Tensile Strength, psi | 426 | 398 | 430 | 402 | 413 | 349 | 351 | 346 |
| Izod Impact Strength, psi | 0.295 | .311 | 0.232 | 0.295 | 0.350 | 0.20 | 0.23 | 0.23 |

[1] P400 is a commercially available polyoxypropylene glycol having a functionality of 2 and a hydroxyl equivalent weight of about 200.

[2] PAPI is a commercially available polymethylene polyphenyl isocyanate having an average NCO functionality of about 2.6 and an NCO equivalent weight of about 134.

[3] VORANOL RS350 is a commercially available reaction product of sucrose with propylene oxide having a hydroxyl equivalent weight of about 162.

The above data indicates that the quantities of ethylene oxide employed to provide polyols of reduced viscosity does not significantly affect the physical properties of the foam.

I claim:

1. A low viscosity polyether polyol having a hydroxyl functionality in the range of from about 4 to about 8, an active hydrogen equivalent weight of from about 80 to about 220 which is the reaction product of
   A. A hydroxyl-containing initiator compound having from about 4 to about 8 hydroxyl groups per molecule or a mixture of an initiator compound having 3 hydroxyl groups per molecule and a solid initiator compound having from about 4 to about 8 hydroxyl groups with
   B. A mixture of alkylene oxides comprising from about 1 to about 50 percent by weight of ethylene oxide and from about 50 to about 99 percent by weight of a vicinal alkylene oxide having from about 3 to about 4 carbon atoms.

2. The polyether polyol of claim 1 wherein the active hydrogen equivalent weight is from about 100 to about 190, reactant A is a solid initiator compound having from about 4 to about 8 hydroxyl groups and reactant B is a mixture comprising from about 2 to about 10 percent by weight of ethylene oxide and from about 90 to 98 percent by weight of a vicinal alkylene oxide having from 3 to about 4 carbon atoms.

3. The polyether polyol of claim 1 wherein the reactant A is a mixture of sucrose and glycerine.

4. The polyether polyol of claim 2 wherein the reactant A is a cycloaliphatic hydroxyl-containing compound.

5. The polyether polyol of claim 2 wherein the reactant A is an aliphatic-hydroxyl-containing compound.

6. The polyether polyol of claim 4 wherein reactant A is sucrose.

7. The polyether polyol of claim 5 wherein reactant A is pentaerythritol.

8. In a process for the preparation of polyether polyols by reacting (A) initiator compounds having from about 4 to about 8 hydroxyl groups per molecule or mixtures of initiator compounds having from about 4 to about 8 carbon atoms with an initiator compound having about 3–8 hydroxyl groups and (B) a vicinal alkylene oxide having from about 3 to about 4 carbon atoms in the presence of a suitable catalyst, the improvement comprising mixing the alkylene oxide reactant with from about 1 to about 50 weight percent of ethylene oxide based upon total weight of the oxides and wherein the reaction is conducted in the absence of added quantities of water.

9. The process of claim 8 wherein the reaction is conducted by the bulk polymerization technique.

10. The process of claim 9 wherein the reaction is conducted in the absence of a liquid inert slurrying compound.

11. The process of claim 10 wherein the alkylene oxide reactant is mixed with from about 1 to about 10 percent by weight of ethylene oxide.

12. The process of claim 11 wherein the initiator compound is sucrose.

13. The process of claim 11 wherein the initiator compound is a mixture of sucrose and glycerine.

* * * * *

UNITED STATES PATENT OFFICE
CERTIFICATE OF CORRECTION

PATENT NO. : 3,865,806
DATED : Feb. 11, 1975
INVENTOR(S) : Louis Robert Knodel

It is certified that error appears in the above-identified patent and that said Letters Patent are hereby corrected as shown below:

Col. 8, Claim 8, line 31, change "carbon atoms" to --hydroxyl groups--.

Signed and Sealed this sixth Day of January 1976

[SEAL]

Attest:

RUTH C. MASON
Attesting Officer

C. MARSHALL DANN
Commissioner of Patents and Trademarks